US011477057B1

(12) United States Patent
Bhuta et al.

(10) Patent No.: US 11,477,057 B1
(45) Date of Patent: Oct. 18, 2022

(54) QUARTER RATE SPECULATIVE DECISION FEEDBACK EQUALIZER (DFE) AND METHOD FOR OPERATING THEREOF

(71) Applicant: SAMSUNG ELECTRONICS CO., LTD., Suwon-si (KR)

(72) Inventors: Parin Rajnikant Bhuta, Bangalore (IN); Saikat Hazra, Bangalore (IN); Sanjeeb Kumar Ghosh, Bangalore (IN); Sushrant Monga, New Delhi (IN)

(73) Assignee: Samsung Electronics Co., Ltd.

( * ) Notice: Subject to any disclaimer, the term of this patent is extended or adjusted under 35 U.S.C. 154(b) by 0 days.

(21) Appl. No.: 17/405,514

(22) Filed: Aug. 18, 2021

(30) Foreign Application Priority Data

Jun. 22, 2021 (IN) .............................. 202141028073

(51) Int. Cl.
    *H04L 25/03*     (2006.01)

(52) U.S. Cl.
    CPC .. *H04L 25/03063* (2013.01); *H04L 25/03057* (2013.01); *H04L 25/03146* (2013.01); *H04L 25/03267* (2013.01); *H04L 25/03885* (2013.01); *H04L 2025/0349* (2013.01); *H04L 2025/03509* (2013.01)

(58) Field of Classification Search
    CPC ......... H04L 25/03006; H04L 25/03019; H04L 25/03057; H04L 25/03063; H04L 25/03146; H04L 25/03267; H04L 25/03885; H04L 2025/0349; H04L 2025/03509
    USPC ........ 375/232, 233, 346, 348, 350; 708/322, 708/323
    See application file for complete search history.

(56) References Cited

U.S. PATENT DOCUMENTS

| 8,611,473 | B1 | 12/2013 | Warner |
| 9,385,651 | B2 | 7/2016 | Zong et al. |
| 9,467,312 | B2 | 10/2016 | Ganzerli et al. |
| 10,141,941 | B2 | 11/2018 | Petrov |
| 10,341,145 | B2 | 7/2019 | Musah et al. |
| 10,536,303 | B1* | 1/2020 | Pike ....................... H03K 5/135 |
| 2011/0249774 | A1* | 10/2011 | Thakkar ................ H04L 7/0087 |
| | | | 375/316 |

(Continued)

FOREIGN PATENT DOCUMENTS

| EP | 2919427 A1 | 9/2015 |
| WO | 2016140743 A1 | 9/2016 |
| WO | 2018121187 A1 | 7/2018 |

*Primary Examiner* — Young T. Tse
(74) *Attorney, Agent, or Firm* — Myers Bigel, P.A.

(57) ABSTRACT

Accordingly embodiments herein disclose a quarter rate speculative DFE. The quarter rate speculative DFE includes a plurality of sampler circuits connected to an input terminal. The plurality of sampler circuits are configured to sample an input signal into a plurality of data samples in parallel. A plurality of quarter rate look ahead circuit connected to the plurality of sampler circuits. The plurality of quarter rate look ahead circuit is configured to simultaneously perform an align operation and a look ahead operation on the plurality of data samples based on the different clock phases to obtain a plurality of latched outputs. A plurality of multiplexers connected to the plurality of quarter rate look ahead circuit. The plurality of multiplexers is configured to generate two speculative data streams by multiplexing respective correction coefficients of each of the plurality of latched outputs.

18 Claims, 6 Drawing Sheets

(56) References Cited

U.S. PATENT DOCUMENTS

| | | | |
|---|---|---|---|
| 2013/0028313 A1* | 1/2013 | Shen | H04L 25/03057 375/233 |
| 2014/0226707 A1* | 8/2014 | Kaviani | H04L 25/03057 375/233 |
| 2018/0097665 A1* | 4/2018 | Li | H04L 25/03019 |
| 2019/0273639 A1* | 9/2019 | Jose | H04L 25/0314 |

* cited by examiner

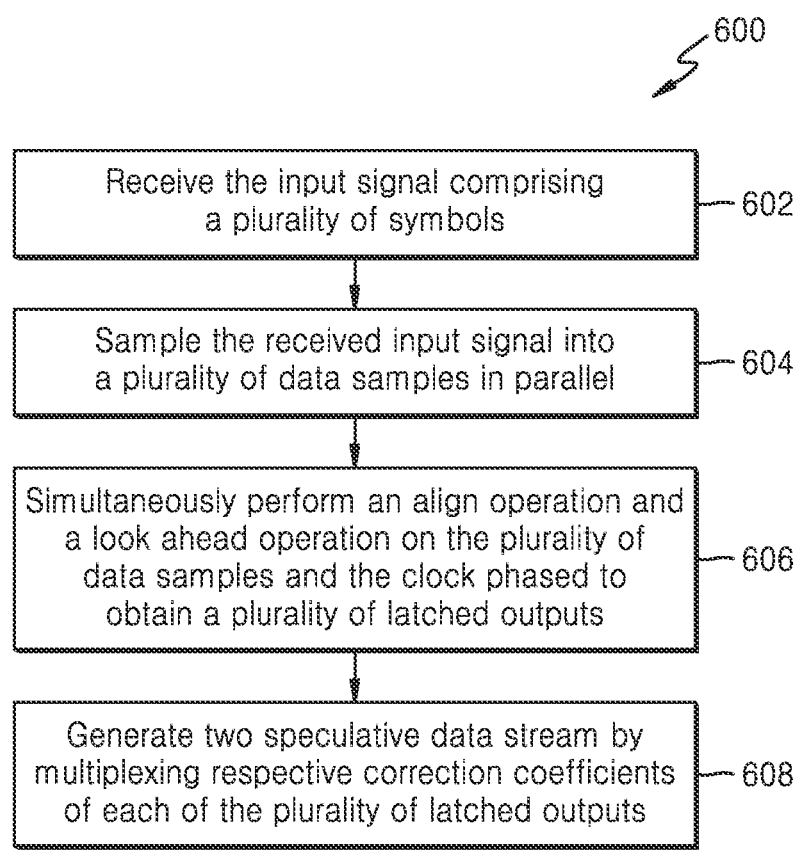

US 11,477,057 B1

QUARTER RATE SPECULATIVE DECISION FEEDBACK EQUALIZER (DFE) AND METHOD FOR OPERATING THEREOF

CROSS-REFERENCE TO RELATED APPLICATION

This U.S. non-provisional patent application claims priority under 35 U.S.C. § 119 to Indian Patent Application No. 202141028073 filed on Jun. 22, 2021, the disclosure of which is incorporated herein in its entirety by reference.

FIELD

The present disclosure relates to a wireline communication system, and more specifically relates to a serial high speed quarter rate speculative decision feedback equalizer (DFE) and method for operating thereof.

BACKGROUND

High speed serial links employ a speculative DFE with look-ahead logic to move a critical first tap 1 Unit Interval (UI) timing requirement for a loop closure into a sampled domain running at a lower frequency. The speculative DFE may use higher power, have greater complexity, and increase latency. As a part of the speculative DFE, the speculative DFE generates two parallel speculative words based on both assumptions of the previous bit being 1 or 0 and then resolves parallel paths with a single bit feedback. In order to resolve all parallel paths with a single bit feedback, the speculative DFE needs to align samples sampled by different phases of clock to a particular phase, perform look ahead operation, and/or perform multiplexer selection to select one of the speculative paths. This entire operation of sampling, realignment, look ahead operation and final multiplexer selection consumes multiple clock cycles which increases the latency of the clock and data recovery (CDR) loop.

Thus, it is desired to address the above mentioned disadvantages or other shortcomings.

SUMMARY

Accordingly, embodiments herein disclose a quarter rate speculative DFE. The quarter rate speculative DFE includes an input terminal configured to receive an input signal comprising a plurality of symbols. A plurality of sampler circuits connected to the input terminal. The plurality of sampler circuits are configured to sample the input signal that was received into a plurality of data samples in parallel. The plurality of data samples are sampled by a plurality of different clock phases at a specified rate. A plurality of quarter rate look ahead circuits are connected to the plurality of sampler circuits. The plurality of quarter rate look ahead circuits are configured to simultaneously perform an align operation and a look ahead operation on the plurality of data samples based on different clock phases to obtain a plurality of latched outputs. A plurality of multiplexers are connected to the plurality of quarter rate look ahead circuit. The plurality of multiplexers are configured to select a corresponding one of two respective speculative data streams generated by multiplexing respective correction coefficients of each of the plurality of latched outputs.

Some embodiments herein disclose a quarter rate speculative decision feedback equalizer (DFE) that includes an input terminal configured to receive an input signal comprising a plurality of symbols, and a plurality of sampler circuits configured to sample the input signal that was received and generate a plurality of data samples in parallel. The plurality of sampler circuits use a plurality of different clock phases at a specified data rate. The quarter rate speculative DFE includes a plurality of quarter rate look ahead circuits that are connected to the plurality of sampler circuits and are configured to simultaneously perform an align operation and a look ahead operation on the plurality of data samples based on the different clock phases to obtain a plurality of latched outputs, and a plurality of multiplexers that are connected to the plurality of quarter rate look ahead circuits and are configured to select a corresponding one of two respective speculative data streams generated by multiplexing respective correction coefficients of each of the plurality of latched outputs. The first and second select lines of corresponding ones of the plurality of multiplexers are driven based on one of the data outputs of the plurality of quarter rate look ahead circuits, and the third and fourth select lines of corresponding ones of the plurality of multiplexers are driven based on a multiplexer output of one of the plurality of multiplexers.

Some embodiments herein disclose a method for operating a quarter rate speculative DFE in a communication system. The method includes receiving, by the quarter rate speculative DFE, an input signal comprising a plurality of symbols. Further, the method includes sampling, by the quarter rate speculative DFE, the input signal that was received into a plurality of streams of data samples in parallel. The plurality of streams of data samples are sampled by different clock phases at a specified data rate. The method includes simultaneously performing, by the quarter rate speculative DFE, an align operation and a look ahead operation on the plurality of streams of data samples and the clock phases to obtain a plurality of latched outputs. The method includes generating, by the quarter rate speculative DFE, two speculative data stream by multiplexing respective correction coefficients of each of the plurality of latched outputs.

These and other aspects of the embodiments herein will be better appreciated and understood when considered in conjunction with the following description and the accompanying drawings. It should be understood, however, that the following descriptions, while indicating example embodiments and numerous specific details thereof, are given by way of illustration and not of limitation. Many changes and modifications may be made within the scope of the embodiments herein without departing from the scope thereof, and the embodiments herein include all such modifications.

BRIEF DESCRIPTION OF THE DRAWINGS

The quarter rate speculative DFE and the related method are illustrated in the accompanying drawings, throughout which like reference letters indicate corresponding parts in the various figures. The embodiments herein will be better understood from the following description with reference to the drawings, in which:

FIG. 6 is a flow diagram illustrating a method for operating a quarter rate speculative DFE in a communication system, according to some embodiments as disclosed herein.

DETAILED DESCRIPTION

Figure 1:
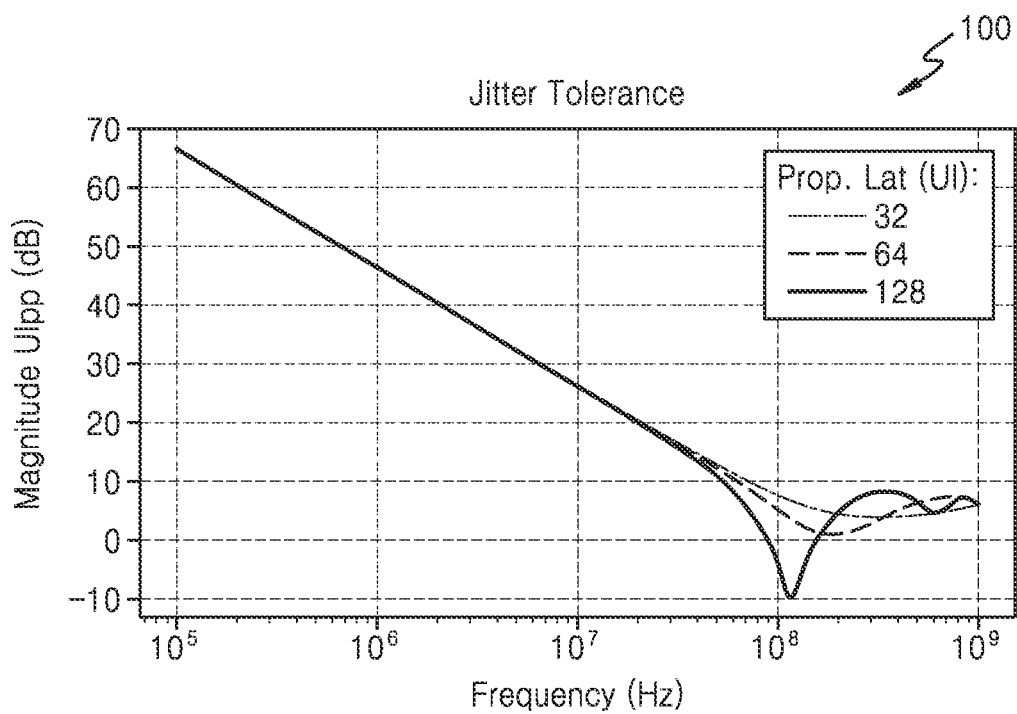
FIG. 1 is a graph illustrating a JTOL performance v/s loop latency, according to prior art.

The embodiments herein and the various features and details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings. Although the terms first, second, etc. may be used herein to describe various elements, these elements should not be limited by these terms. These terms are generally only used to distinguish one element from another.

An objective of the embodiments herein is to provide a quarter rate speculative DFE and a look ahead operation to reduce clock and data recovery (CDR) loop delay/latency in a high speed serial wireline communication system. The reduction in the CDR loop latency helps reduce dip in a Jitter tolerance (JTOL) around bandwidth and thereby improves overall JTOL performance. The quarter rate speculative DFE assists in relaxing a timing requirement for speculative DFE at the same time optimizing a sampled data latency with reduced power.

Another objective of the embodiments herein is to provide the quarter rate speculative DFE that does not perform the alignment of samples operation and the look ahead operation sequentially, but combine the sample alignment and look ahead operations in an efficient way to reduce a number of realign flip flops which in-turn helps reduce latency and power.

Accordingly, embodiments herein achieve a quarter rate speculative DFE. The quarter rate speculative DFE includes an input terminal configured to receive an input signal comprising a plurality of symbols. A plurality of sampler circuits are connected to the input terminal. The plurality of sampler circuits are configured to sample the received input signal into a plurality of data samples in parallel. The plurality of data samples are sampled by a plurality of different clock phases at a specified data rate. A plurality of quarter rate look ahead circuits are connected to the plurality of sampler circuits. The plurality of quarter rate look ahead circuits are configured to simultaneously perform an align operation and a look ahead operation on the plurality of data samples and the clock phases to obtain a plurality of latched outputs. A plurality of multiplexers are connected to the plurality of quarter rate look ahead circuit. The plurality of multiplexers are configured to select amongst two speculative data streams by multiplexing respective correction coefficients of each of the plurality of latched outputs.

Unlike conventional methods and system, the proposed quarter rate speculative DFE and the look ahead operation reduce a loop delay/latency in a wireline communication system. Any latency in the CDR loop path may include a right half plane (RHP) zero, which has an impact of producing undershoot in the JTOL plot. The proposed quarter rate speculative DFE helps to reduce the undershoot in a JTOL by reducing the overall latency in the CDR loop and thereby improving the overall JTOL performance. This improvement may be achieved by reducing the number of flip flops required to realign and perform the look ahead operation by combining the realignment operation with the look ahead operation rather than performing those operations sequentially. The quarter rate speculative DFE assists in relaxing a timing requirement for speculative DFE, while at the same time optimizing or reducing a sampled data latency with reduced power.

Further, in some embodiments, the quarter rate speculative DFE may not perform the aligning of samples operation and the look ahead operation sequentially, but combines these operations in an efficient way to reduce the number of realign flip flops to help reduce latency and power.

Figure 4:
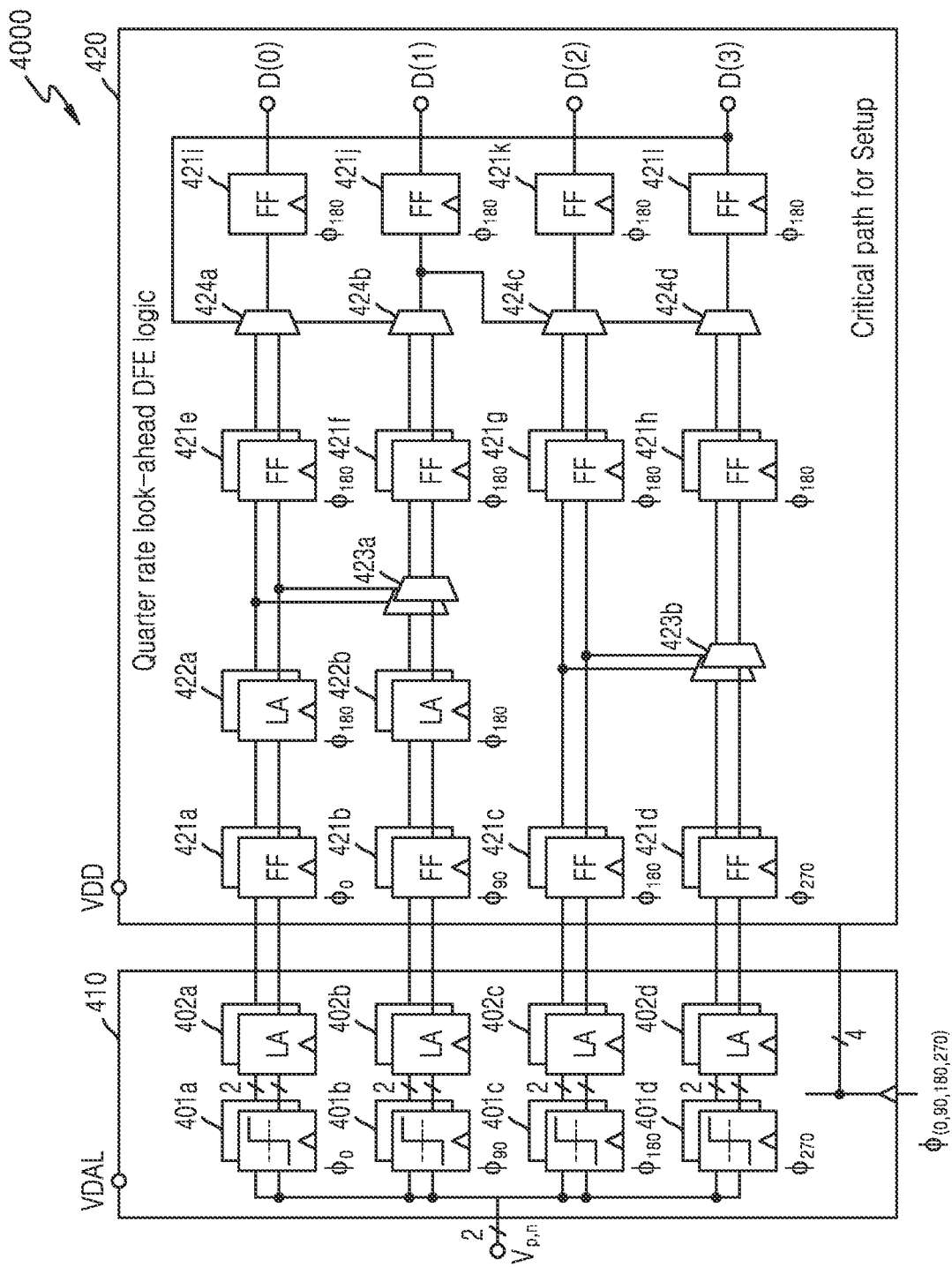
FIG. 4 is a circuit diagram of a quarter rate speculative DFE, according to some embodiments as disclosed herein.
Figure 5:
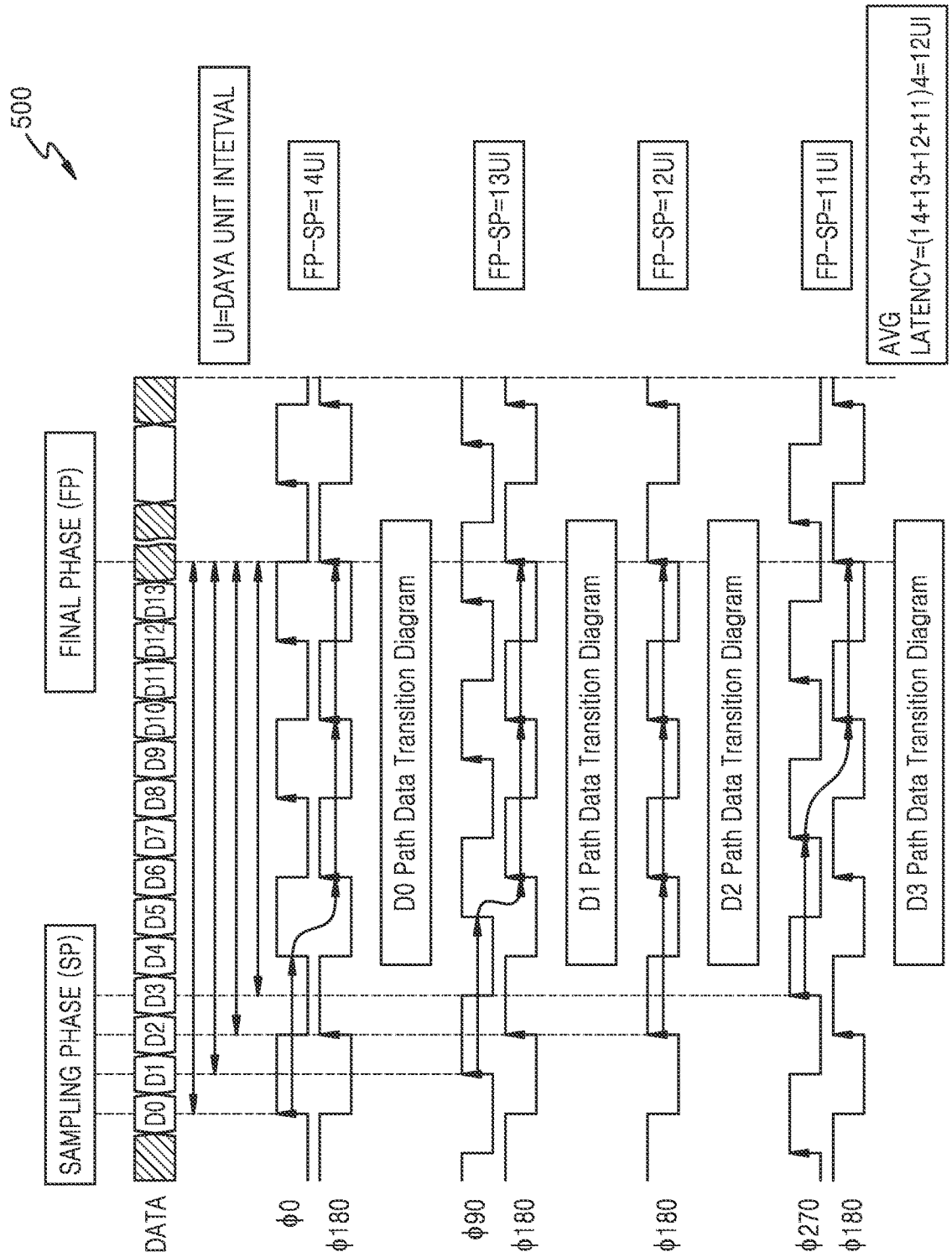
FIG. 5 is a timing diagram of a quarter rate speculative DFE, according to some embodiments as disclosed herein.

Referring now to the drawings, and more particularly to FIGS. 4 through 6, embodiments of the quarter rate speculative DFE are illustrated.

FIG. 1 is a graph (100) illustrating a JTOL performance v/s loop latency, according to prior art. As the proportional path loop latency increases, the graph shows a dip in the JTOL performance. In an example, 32UI loop latency shows worst case 4 dB (UIp-p) v/s worst case 2.5 dB (UIp-p) @ 64UI, 2× increase in latency with about 40% reduction in UIp-p JTOL margin, and a 0.25× increase corresponds to ~5%. The higher delay can cause system instability. Hence, reducing loop latency in the CDR loop path improves the JTOL performance.

Figure 2:
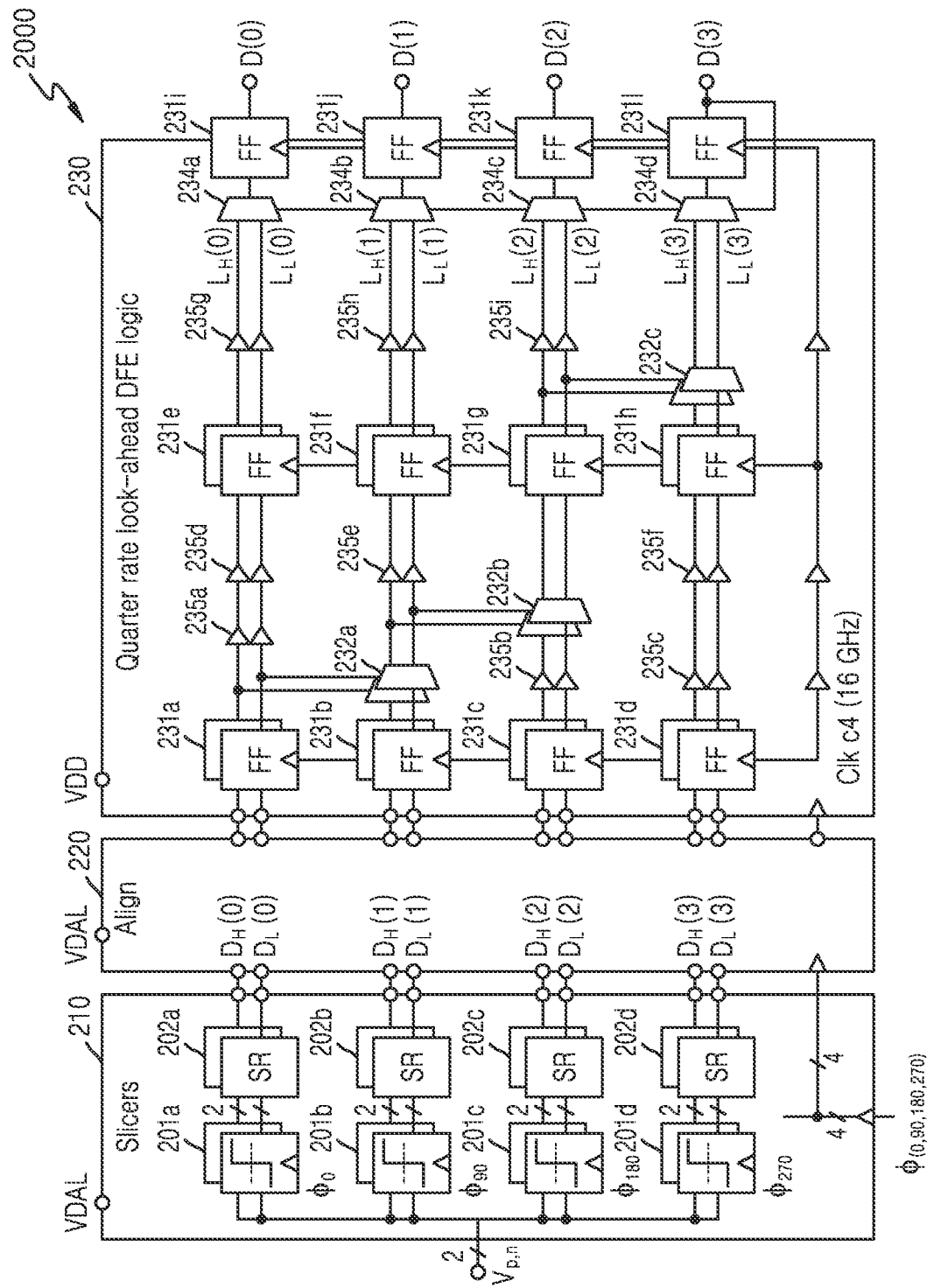
FIG. 2 is a circuit diagram of a quarter rate speculative DFE, according to prior art.

FIG. 2 is a circuit diagram of a quarter rate speculative DFE (2000), according to prior art. The quarter rate speculative DFE (2000) includes a sampler circuit (210) to perform sampling of incoming signal, an alignment circuit (220) to align the samples to a single clock phase, a look ahead logic circuit (230) to relax the first tap feedback timing, and a mux selection circuit (234a-234d) to select amongst the two speculative streams. Referring to FIG. 2, Vp,n is a full-rate differential output from a continuous time linear equalizer (CTLE) stage preceding the DFE (2000). This full-rate differential signal is then sampled via quarter rate speculative DFE which uses four equally spaced clock phases ($\phi_0$, $\phi_{90}$, $\phi_{180}$, $\phi_{270}$) running at $\frac{1}{4}^{th}$ the data rate (i.e., quarter rate). A strong-arm latch based clocked sampler/slicer (201a-201d) is used to sample the incoming full rate data and convert the incoming full rate data into an appropriate digital equivalent. Each of the four phases of clock sample the incoming data Vp,n at four different time instants so as to create four fully differential parallel streams. Each clock phase is used to drive two of the slicers (201a-201d) to generate two speculative bit streams, where one of the slicers applies DFE tap correction by adding a negative offset (this represents that the previous bit was '1') and in the other slicer, the DFE tap correction is applied by adding positive offset (this represents that the previous bit was '0'). The slicers (201a-201d) evaluate or sample the input on the positive level of the clock and reset on the negative level of the clock hence, the output of these slicers are Return to Zero (RZ) signals. These RZ slicer outputs are then converted to Non Return to Zero (NRZ) signals using the standard SR latch (202a-202d). SR latch (202a-202d) also operates on the same clock phase as the slicer (201a-201d), and holds on to the previously sampled state when the slicer (201a-201d) outputs go into the reset phase. Thus, at the output of the slicers block (consisting of slicers (201a-201d) & SR latches (202a-202d)), the slicers (201a-201d) & SR latches (202a-202d) have eight parallel fully differential bit streams $D_H(0:3)$ (which represents the bit streams sampled by clock phases $\phi_0, \phi_{90}, \phi_{180}, \phi_{270}$ respectively considering negative offset) and $D_L(0:3)$ (which represents the bit streams sampled by clock phases $\phi_0, \phi_{90}, \phi_{180}, \phi_{270}$ respectively considering positive offset). Although $D_H(0)$ and corresponding $D_L(0)$ are aligned as they are sampled with same clock phase, they are not aligned with remaining $D_H(1), D_H(2)$ and $D_H(3)$ or $D_L(1), D_L(2)$ and $D_L(3)$ as they are sampled on different clock phases. Hence all the slicers outputs $D_H(0:3)$ and $D_L(0:3)$ are realigned to a particular phase of the clock (in this case aligned to $\phi_{270}$) by using flops/latches within the "align" block. Look ahead logic circuit (230) includes flip flops (231a-231d) that are connected to alignment circuit (220). Flip flop (231b) is connected to multiplexer (232a)

The architecture of the alignment circuit (220) is chosen so as to align the samples to particular clock phase with minimum or reduced latency and/or maximum or increased setup/hold margins of the flipflops/latches within the DFE (2000). At the output of the align block, the eight fully differential parallel bit streams are aligned to the $\phi_{270}$ clock phase. These bit streams are then further processed using the quarter rate "look ahead logic". The look ahead logic block receives eight realigned parallel streams $D_H(0:3)$ and $D_L(0:3)$ along with the clock ($\phi_{270}$) at which all the samples are aligned. As DFE is a feedback equalizer, there is a cyclic dependency where the evaluation of the next bit depends on the accurate decision of the previous bit. In a non-limiting example, if the four data bits sampled by the four phases of the clocks ($\phi_0, \phi_{90}, \phi_{180}, \phi_{270}$) are D(0), D(1), D(2), D(3) respectively, then for the D(1) bit to be evaluated, the D(0) bit should have been evaluated prior hand. Similarly, for the D(2) bit, the D(1) should have been evaluated and so on. However, if the evaluation of the current bit is dependent on its immediate previous bit, then a 1UI feedback timing path may be created, which may become difficult to meet as the data rates increases. So to avoid this 1UI timing path, the carry look ahead logic ensures that the samples D(0), D(1), D(2), D(3) do not depend on the evaluation of their immediate previous bit but depend on evaluation of a bit which is 4UI away. Consider an example in which, for the evaluation of D(0), D(1), D(2), D(3), two speculative bit streams are presented to the final selection multiplexer whose select line (which is the feedback) is such that it creates a 4UI timing path rather than a standard 1UI timing path. 4UI may be the best possible timing window available considering the quarter rate clocks. This is the maximum timing available, considering that the DFE (2000) wants to perform the DFE operation on the maximum clock rate.

Further, the DFE (2000) could have chosen to do the DFE operation at a divided clock rate, which would have relaxed the feedback timing at the cost of higher latency and power as a higher number of flip flops or latches would be required to process the further parallelized data bit stream. However, in order to improve the latency, the feedback path timing was relaxed to 4UI (and not more) which is sufficient for the data rates that this logic was designed for. The carry look ahead receives two speculative DFE output per phase of the clock, and the carry look ahead removes the cyclic dependency of the current bit on the immediate previous bit by using intermediate multiplexers. As an example, for choosing one amongst the speculative $D_H(1)$ or $D_L(1)$, the previous data (D(0)) should have been evaluated, but to avoid that 1UI dependency, the DFE (2000) considers that D(0) is not evaluated as yet and uses both the speculative options $D_H(0)$ and $D_L(0)$ to generate two speculative options for $D_H(1)$ and $D_L(1)$. By doing this, the DFE (2000) has removed its dependency on its exact evaluation of the 1UI bit. Now, the DFE (2000) can remove the dependency of $D_H(2)$ and $D_L(2)$ on exact evaluation of D(1) by using both the speculative options of $D_H(1)$ and $D_L(1)$.

Similarly, the DFE (2000) can remove the dependency of $D_H(3)$ and $D_L(3)$ on the exact evaluation of D(2) by using both the speculative options of $D_H(2)$ and $D_L(2)$. This operation to generate D(3) resolves the speculation of all the four paths. The pipelining needs to be done so that the DFE (2000) does not have more than two multiplexers in the path between the two flip flops. The DFE (2000) needs to match all the path delays of the four paths amongst themselves and match it with the clock path delay to avoid any setup/hold margin loss between any of the flop-flop paths. To match the path delays, buffers 235a-235i may be included in various data paths. A flip flop (231e) is connected between buffer (235d) and buffer (235g). A flip flop (231f) is connected between buffer (235e) and buffer (235h). A flip flop (231g) is connected between multiplexer (232b) and buffer (235i). A flip flop (231h) is connected between buffer (235f) and multiplexer (232c). The first column of the flip flops in the "carry look ahead logic" flops or triggers the output of the "align" block. Before entering into the next column of pipelining flip flops, the dependency of $D_H(1)$ and $D_L(1)$ on D(0) and $D_H(2)$ and $D_L(2)$ on D(1) is removed by using multiplexers. As the setup path of flop-flop was designed to not have more than two multiplexers in the data path, one more column of pipelining flip flops was used. The dependency of $D_H(3)$ and $D_L(3)$ on D(2) is removed with this second column of pipelining flip flops by using the speculative versions of D(2) via $D_H(2)$ and $D_L(2)$. Now at the final multiplexer input, the DFE (2000) may have eight bit streams $L_H(0:3)$ and $L_L(0:3)$ such that the final evaluation is not dependent on the immediate previous bit but dependent on the evaluation of the bit that is 4UI away. All the digital logic up to $L_H(n)$ and $L_L(n)$ is feed-forward and can be easily pipelined to meet the timing. The select lines of the multiplexers are driven from the D(3) path, which basically resolves the speculation. The dependence of each bit on the previous bit is broken in the new speculative array, which results in a relaxed timing constraint of tc2q+tmux+tsetup<4UI.

Figure 3:
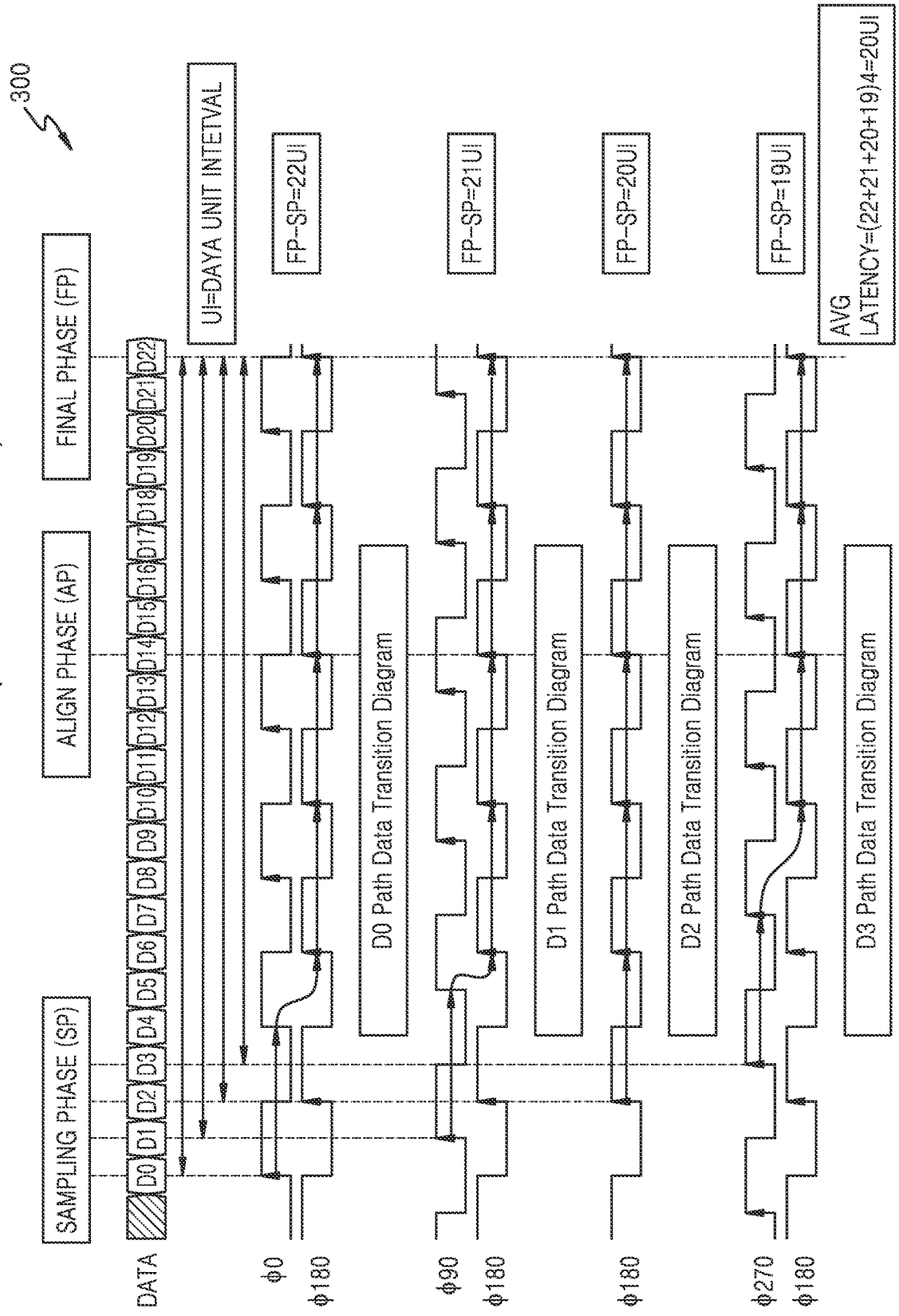
FIG. 3 is a timing diagram of a quarter rate speculative DFE, according to prior art.

FIG. 3 is a timing diagram (300) of the quarter rate speculative DFE (2000), according to prior art. Referring to FIG. 3, full rate DATA is sampled using 4 phases of the quarter rate clocks. In an example, D(0)/D(1)/D(2)/D(3) is sampled using 0/90/180/270 degree clocks (sampling phase) respectively. All the sampled data is then aligned to 180-degree phase clock (align phase) by retiming the sampler outputs using flip flops and latches. Once all the samples are aligned at the align phase, then the carry look ahead is just a feed-forward pipeline stage where the data is flopped and resolved at the final phase. The total delay from the sampling phase to final phase can be found by counting the number of hops as shown in a clock transition diagram. The data delay can be observed to be 22UI/21UI/20UI/19UI for the clock phases 0/90/180/270 respectively. So on an average the latency can be calculated to be (22+21+20+19)/4=20.5UI.

FIG. 4 is a circuit diagram of a quarter rate speculative DFE (4000), according to some embodiments as disclosed herein. The quarter rate speculative DFE (4000) can be used in an electronic device. The electronic device can be, for example, but not limited to a cellular phone, a smart phone, a Personal Digital Assistant (PDA), a wireless modem, a tablet computer, a laptop computer, a wireless local loop (WLL) station, a Universal Serial Bus (USB) dongle, and/or an Internet of Things (IoT).

Referring to FIG. 4, the quarter rate speculative decision feedback equalizer (DFE) (4000) includes an input terminal, a plurality of sampler circuits (410), a plurality of quarter rate look ahead circuit (420) and a plurality of multiplexers (424a-424d). The input terminal receives an input signal comprising a plurality of symbols. The input signal is a full-rate differential output from a CTLE stage preceding the quarter rate speculative DFE (4000).

The plurality of sampler circuits (410) are connected to the input terminal. The plurality of sampler circuits (410) are configured to sample the received input signal into a plurality of data samples in parallel. The plurality of data samples are sampled by a plurality of different clock phases at a specified data rate.

The sampler circuit (410) includes a plurality of slicer circuits (401a-401d) and a plurality of a latches (402a-402d). A first slicer circuit (401a) from the plurality of slicer circuits (401a-401d) is connected with a first latch (402a) of the plurality of latches (402a-402d). A second slicer circuit (401b) from the plurality of slicer circuits (401a-401d) is connected with a second latch (402b) of the plurality of latches (402a-402d). A third slicer circuit (401c) from the plurality of slicer circuits (401a-401d) is connected with a third latch (402c) of the plurality of latches (402a-402d). A fourth slicer circuit (401d) from the plurality of slicer circuits (401a-401d) is connected with a fourth latch (402d) of the plurality of latches (402a-402d). The first slicer circuit (401a), the second slicer circuit (401b), the third slicer circuit (401c) and the fourth slicer circuit (401d) from the plurality of slicer circuits (401a-401d) generate two speculative bit streams corresponding to the data sample by adding a negative offset of a close phase to the input signal and a positive offset of the close phase to the input signal.

The first slicer circuit (401a) samples the input signal on a positive level of a first clock phase from the plurality of different clock phases, resets on a negative level of the first clock phase to generate a first Return-to-Zero (RZ) signal from a plurality of RZ signals, and feeds the first RZ signal to the first latch (402a) of the plurality of latches (402a-402d). The second slicer circuit (401b) samples the input signal on a positive level of a second clock phase from the plurality of different clock phases, resets on a negative level of the second clock phase to generate a second RZ signal from the plurality of RZ signals, and feeds the second RZ signal to the second latch (402b) of the plurality of latches (402a-402d). The third slicer circuit (401c) samples the input signal on a positive level of a third clock phase from the plurality of different clock phases, resets on a negative level of the third clock phase to generate a third RZ signal from the plurality of RZ signals, and feeds the third RZ signal to the third latch (402c) of the plurality of latches (402a-402d). The fourth slicer circuit (401d) samples the input signal on a positive level of a fourth clock phase from the plurality of clock phases to generate a fourth RZ single from the plurality of RZ signals, and feed the fourth RZ signal to the fourth latch (402d) of the plurality of latches (402a-402d).

The first latch (402a) receives the first RZ signal from the first slicer circuit (401a) and converts the first RZ signal into a first Non-Return to-Zero (NRZ) signal. The first slicer circuit (401a) and the first latch (402a) are operated at a first clock phase of the plurality of different clock phases. The second latch (402b) receives the second RZ signal from the second slicer circuit (401b) and converts the second RZ signal into a second Non-Return to-Zero (NRZ) signal. The second slicer circuit (401b) and the second latch (402b) are operated at a second clock phase of the plurality of different clock phases. The third latch (402c) receives the third RZ signal from the third slicer circuit (401c) and converts the third RZ signal into a third Non-Return to-Zero (NRZ) signal. The third slicer circuit (401c) and the third latch (402c) are operated at a third clock phase of the plurality of different clock phases. The fourth latch (402d) receives the fourth RZ signal from the fourth slicer circuit (401d) and converts the fourth RZ signal into a fourth Non-Return to-Zero (NRZ) signal. The fourth slicer circuit (401d) and the fourth latch (402d) are operated at a fourth clock phase of the plurality of different clock phases.

The first latch (402a) holds on to a previously sampled state of the first slicer circuit (401a) when the output of the first slicer circuit (401a) moves into a reset phase. The second latch (402b) holds on to a previously sampled state of the second slicer circuit (401b) when the output of the second slicer circuit (401b) moves into a reset phase. The third latch (402c) holds on to a previously sampled state of the third slicer circuit (401c) when the output of the third slicer circuit (401c) moves into a reset phase. The fourth latch (401d) holds on to a previously sampled state of the fourth slicer circuit (402d) when the output of the fourth slicer circuit (401d) moves into a reset phase.

The plurality of quarter rate look ahead circuits (420) are connected to the plurality of sampler circuits (410). The plurality of quarter rate look ahead circuits (420) are configured to simultaneously perform an align operation and a look ahead operation on the plurality of data samples and the clock phases to obtain a plurality of latched outputs.

The plurality of multiplexers (424a-424d) are connected to the plurality of quarter rate look ahead circuits (420). The plurality of multiplexers (424a-424d) are configured to select amongst two speculative data stream by multiplexing respective correction coefficients of each of the plurality of latched outputs.

The plurality of quarter rate look ahead circuits (420) includes a first flip flop (421a) connected with the first latch (402a). The first flip flop (421a) receives the first NRZ signals from the first latch (402a) and samples and flops or triggers the first NRZ signals with the first clock phase in a first pipelining stage. The outputs of the first NRZ signals are latched and flopped using the second clock phase to generate a first latched output of the plurality of latched outputs. A second flip flop (421e) is connected to a first latch (422a). The first flip flop (421a) is driven by same clock phases on which the first slicer circuit (401a) is operated. A third flip flop (421b) is connected with a second latch (402b). The third flip flop (421b) receives the second NRZ signals from a second latch (402b) of the sampler circuit (410) and is connected to latch (422b). Latch (422b) is connected to multiplexer (423a). The second NRZ signals are sampled and flopped with a third clock phase in a second pipelining stage. The outputs of the first NRZ signals are latched and flopped using a fourth clock phase to generate a second latched output of the plurality of latched outputs. The third clock phase is different than the fourth clock phase. A fourth flip flop (421b) is connected to the second latch (421f), where the third flip flop (421b) is driven by same clock phases on which the second slicer (401b) is operated. A fifth flip flop (421c) is connected with a sixth flip flop (421g). The fifth flip flop (421c) is driven by same clock phases on which the third slicer (401c) is operated. The fifth flip flop (421c) receives third NRZ signals from a third latch (402c) of the sampler circuit (410), wherein the third NRZ signals are sampled and flopped with a fifth clock phase in a third pipelining stage to generate a third latched output of the plurality of latched outputs. A seventh flip flop (421d) is connected with an eighth flip flop (421h), where the seventh flip flop (421d) is driven by same clock phases on which the fourth slicer (401d) is operated. The seventh flip flop (421d) receives fourth NRZ signals from a fourth latch (402d) of the sampler circuit (410). The fourth NRZ signals are sampled and flopped with a sixth clock phase in a fourth pipelining stage to generate a fourth latched output of the plurality of latched outputs. The seventh flip flop (421d) is connected to multiplexer (423b).

The plurality of multiplexers includes a first multiplexer (424a) to generate the two speculative data stream by multiplexing respective correction coefficients of the first latched output from the first latch (402a). A second multiplexer (424b) generates the two speculative data stream by multiplexing respective correction coefficients of the second latched output from the second latch (402b). A third multiplexer (424c) generates the two speculative data streams by multiplexing respective correction coefficients of the third latched output from the third latch (402c). A fourth multiplexer (424d) generates the two speculative data stream by multiplexing respective correction coefficients of the fourth latched output from the fourth latch (402d).

Unlike conventional DFE, the proposed quarter rate speculative DFE and the look ahead operation reduce a loop delay/latency in a communication system. Any latency in the CDR loop path includes a RHP zero which has an impact of producing undershoot in the JTOL plot. The quarter rate speculative DFE helps to reduce the dip in a Jitter tolerance (JTOL) around the operational bandwidth and improves the JTOL performance. The quarter rate speculative DFE assists in relaxing a timing requirement for speculative DFE, while at the same time optimizing a sampled data latency with reduced power.

Further, the quarter rate speculative DFE that does not do aligning of samples and look ahead operation sequentially but combines them in an efficient way to reduce the number of realign flip flops which helps reduce latency and power. Reduced latency enhances JTOL performance. Furthermore, buffers to match the path delays may not need to be included in various data paths, further reducing the number of elements in the circuit and thus reducing power consumption of the circuit.

FIG. 5 is a timing diagram (500) of a quarter rate speculative DFE (4000), according to some embodiments as disclosed herein. Referring to FIG. 5, full rate data is sampled using 4 phases of the quarter rate clocks. In an example, D(0)/D(1)/D(2)/D(3) is sampled using 0/90/180/270 degree clocks (sampling phase) respectively. The total delay from the sampling phase to final phase can be found by counting the number of hops as shown in the clock transition diagram. The data delay can be observed to be 14UI/13UI/12UI/11UI for the clock phases 0/90/180/270 respectively. Therefore, on an average, the latency can be calculated to be (14+13+12+11)/4=12.5UI, so the DFE (4000) get a saving of 8UI out of 20.5UI from the previous scheme discussed with respect to FIG. 2 and FIG. 3.

FIG. 6 is a flow diagram (600) illustrating a method for operating the quarter rate speculative DFE (4000) in a communication system, according to some embodiments as disclosed herein. The operations (602, 604, 606, 608) are performed by the quarter rate speculative DFE (4000). At 602, the method includes receiving the input signal that includes the plurality of symbols. At 604, the method includes sampling the received input signal into the plurality of data samples in parallel. The plurality of data samples are sampled by different clock phases at the specified data rate. At 606, the method includes simultaneously performing the align operation and the look ahead operation on the plurality of data samples and the clock phases to obtain the plurality of latched outputs. At 608, the method includes generating two speculative data stream by multiplexing respective correction coefficients of each of the plurality of latched outputs.

The various actions, acts, blocks, steps, or the like in the flow diagram (600) may be performed in the order presented, in a different order or simultaneously. Further, in some embodiments, some of the actions, acts, blocks, steps, or the like may be omitted, added, modified, skipped, or the like without departing from the scope of the concepts.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of example embodiments, those skilled in the art will recognize that the embodiments herein can be practiced with modification within the scope of the embodiments as described herein.

We claim:

1. A quarter rate speculative decision feedback equalizer (DFE), comprising:
   an input terminal configured to receive an input signal comprising a plurality of symbols;
   a plurality of sampler circuits connected to the input terminal and configured to sample the input signal that was received into a plurality of data samples in parallel, wherein the plurality of data samples are sampled by a plurality of different clock phases at a specified data rate; and
   a plurality of quarter rate look ahead circuits that are connected to the plurality of sampler circuits and are configured to simultaneously perform an align operation and a look ahead operation on the plurality of data samples based on the different clock phases to obtain a plurality of latched outputs,
   wherein the plurality of quarter rate look ahead circuits comprise a plurality of multiplexers that are configured to select a corresponding one of two respective speculative data streams generated by multiplexing respective correction coefficients of each of the plurality of latched outputs, and
   wherein ones of the plurality of latched outputs are output from a first latch, a second latch, a third latch, and a fourth latch of the plurality of sampler circuits, and wherein the plurality of quarter rate look ahead circuits further comprise:
a first flip flop connected to the first latch, wherein the first flip flop is configured to receive a first Non-Return to-Zero (NRZ) signal from the first latch and to sample the first NRZ signal with a first clock phase in a first pipelining stage, and wherein a first output of the first flip flop is latched and triggered by a fifth latch using a second clock phase to generate a first latched output of the plurality of latched outputs;
a second flip flop connected to the fifth latch;
a third flip flop connected to the second latch, wherein the third flip flop is configured to receive a second NRZ signal from the second latch, wherein the second NRZ signal is sampled by a third clock phase in a second pipelining stage, wherein a second output of the third flip flop is latched using a fourth clock phase to generate a second latched output of the plurality of latched outputs, and wherein the third clock phase is different from the fourth clock phase;
a fourth flip flop that is configured to operate responsive to a sixth latch;
a fifth flip flop connected to a sixth flip flop, wherein the fifth flip flop is driven by the third clock phase, wherein the fifth flip flop is configured to receive a third NRZ signal from the third latch, and wherein the third NRZ signal is sampled by a fifth clock phase in a third pipelining stage to generate a third latched output of the plurality of latched outputs; and
a seventh flip flop that is configured to trigger an eighth flip flop, wherein the seventh flip flop is driven by the fourth clock phase, wherein the seventh flip flop is configured to receive a fourth NRZ signal from the fourth latch, and wherein the fourth NRZ signal is sampled by a sixth clock phase in a fourth pipelining stage to generate a fourth latched output of the plurality of latched outputs.

2. The quarter rate speculative DFE of claim 1, wherein the input signal is a full-rate differential output from a continuous time linear equalizer (CTLE) stage preceding the quarter rate speculative DFE.

3. The quarter rate speculative DFE of claim 1, wherein the plurality of sampler circuits comprise:
a plurality of slicer circuits; and
wherein a first slicer circuit of the plurality of slicer circuits is connected with the first latch,
wherein a second slicer circuit of the plurality of slicer circuits is connected with the second latch,
wherein a third slicer circuit of the plurality of slicer circuits is connected with the third latch, and
wherein a fourth slicer circuit of the plurality of slicer circuits is connected with the fourth latch.

4. The quarter rate speculative DFE of claim 3, wherein the first slicer circuit, the second slicer circuit, the third slicer circuit and the fourth slicer circuit of the plurality of slicer circuits each generate two speculative bit streams corresponding to a respective one of the plurality of data samples by adding a negative offset of a close phase to the input signal and a positive offset of the close phase to the input signal.

5. The quarter rate speculative DFE of claim 3,
wherein the first slicer circuit is configured to sample the input signal on a positive level of the first clock phase of the plurality of different clock phases, reset on a negative level of the first clock phase to generate a first Return-to-Zero (RZ) signal of a plurality of RZ signals, and feed the first RZ signal to the first latch of the plurality of sampler circuits,
wherein the second slicer circuit is configured to sample the input signal on a positive level of the second clock phase of the plurality of different clock phases, reset on a negative level of the second clock phase to generate a second RZ signal of the plurality of RZ signals, and feed the second RZ signal to the second latch of the plurality of sampler circuits,
wherein the third slicer circuit is configured to sample the input signal on a positive level of the third clock phase of the plurality of different clock phases, reset on a negative level of the third clock phase to generate a third RZ signal of the plurality of RZ signals, and feed the third RZ signal to the third latch of the plurality of sampler circuits, and
wherein the fourth slicer circuit is configured to sample the input signal on a positive level of the fourth clock phase of the plurality of different clock phases to generate a fourth RZ signal of the plurality of RZ signals, and feed the fourth RZ signal to the fourth latch of the plurality of sampler circuits.

6. The quarter rate speculative DFE of claim 5,
wherein the first latch is configured to receive the first RZ signal from the first slicer circuit and convert the first RZ signal into the first Non-Return to-Zero (NRZ) signal, wherein the first slicer circuit and the first latch are operated at the first clock phase of the plurality of different clock phases,
wherein the second latch is configured to receive the second RZ signal from the second slicer circuit and convert the second RZ signal into the second Non-Return to-Zero (NRZ) signal, wherein the second slicer circuit and the second latch are operated at the second clock phase of the plurality of different clock phases,
wherein the third latch is configured to receive the third RZ signal from the third slicer circuit and convert the third RZ signal into the third Non-Return to-Zero (NRZ) signal, wherein the third slicer circuit and the third latch are operated at the third clock phase of the plurality of different clock phases, and
wherein the fourth latch is configured to receive the fourth RZ signal from the fourth slicer circuit and convert the fourth RZ signal into the fourth Non-Return to-Zero (NRZ) signal, wherein the fourth slicer circuit and the fourth latch are operated at the fourth clock phase of the plurality of different clock phases.

7. The quarter rate speculative DFE of claim 3,
wherein the first latch holds a previously sampled state of the first slicer circuit when an output of the first slicer circuit moves into a reset phase,
wherein the second latch holds a previously sampled state of the second slicer circuit when an output of the second slicer circuit moves into a reset phase,
wherein the third latch holds a previously sampled state of the third slicer circuit when an output of the third slicer circuit moves into a reset phase, and
wherein the fourth latch holds a previously sampled state of the fourth slicer circuit when an output of the fourth slicer circuit moves into a reset phase.

8. The quarter rate speculative DFE of claim 1, wherein the plurality of multiplexers comprise:
a first multiplexer configured to generate two first speculative data streams and multiplex respective correction coefficients of the first latched output from the first latch, wherein a select line of the first multiplexer is connected to a 4UI delayed version of a fourth data output of the plurality of quarter rate look ahead circuits, a second multiplexer configured to generate two second speculative data streams and multiplex respective correction coefficients of the second latched output from the second latch, wherein a select line of the second multiplexer is connected to the 4UI delayed version of the fourth data output of the plurality of quarter rate look ahead circuits, a third multiplexer configured to generate two third speculative data streams and multiplex respective correction coefficients of the third latched output from the third latch, wherein a select line of the third multiplexer is connected to a multiplexer output of the second multiplexer, and a fourth multiplexer configured to generate two fourth speculative data streams and multiplex respective correction coefficients of the fourth latched output from the fourth latch, wherein a select line of the fourth multiplexer is connected to the multiplexer output of the second multiplexer.

9. A method for operating a quarter rate speculative decision feedback equalizer (DFE) in a communication system, the method comprising:

receiving, by the quarter rate speculative DFE, an input signal comprising a plurality of symbols;

sampling, by the quarter rate speculative DFE, the input signal that was received into a plurality of streams of data samples in parallel, wherein the plurality of streams of data samples are sampled by different clock phases at a specified data rate;

simultaneously performing, by the quarter rate speculative DFE, an align operation and a look ahead operation on the plurality of streams of data samples and the different clock phases to obtain a plurality of latched outputs; and generating, by the quarter rate speculative DFE, two speculative data streams by multiplexing respective correction coefficients of each of the plurality of latched outputs, wherein ones of the plurality of latched outputs are output from a first latch, a second latch, a third latch, and a fourth latch, wherein the quarter rate speculative DFE comprises a plurality of quarter rate look ahead circuits that comprise:

a first flip flop connected to the first latch, wherein the first flip flop is configured to receive a first Non-Return to-Zero (NRZ) signal from the first latch and samples the first NRZ signal with a first clock phase in a first pipelining stage, and wherein a first output of the first flip flop is latched and triggered by a fifth latch using a second clock phase to generate a first latched output of the plurality of latched outputs;

a second flip flop connected to the fifth latch;

a third flip flop connected to the second latch, wherein the third flip flop is configured to receive a second NRZ signal from the second latch, wherein the second NRZ signal is sampled by a third clock phase in a second pipelining stage, wherein a second output of the third flip flop is latched using a fourth clock phase to generate a second latched output of the plurality of latched outputs, and wherein the third clock phase is different from the fourth clock phase;

a fourth flip flop that operates responsive to a sixth latch;

a fifth flip flop connected to a sixth flip flop, wherein the fifth flip flop is driven by the third clock phase, wherein the fifth flip flop is configured to receive a third NRZ signal from the third latch, and wherein the third NRZ signal is sampled by a fifth clock phase in a third pipelining stage to generate a third latched output of the plurality of latched outputs; and a seventh flip flop that is configured to trigger an eighth flip flop, wherein the seventh flip flop is driven by the fourth clock phase, wherein the seventh flip flop is configured to receive a fourth NRZ signal from the fourth latch, and wherein the fourth NRZ signal is sampled by a sixth clock phase in a fourth pipelining stage to generate a fourth latched output of the plurality of latched outputs.

10. The method of claim 9, wherein the input signal comprises a full-rate differential output from a continuous time linear equalizer (CTLE) stage preceding the quarter rate speculative DFE.

11. The method of claim 9, wherein the quarter rate speculative DFE comprises a plurality of sampler circuits that comprise:

a plurality of slicer circuits; and
a plurality of latches,
wherein a first slicer circuit of the plurality of slicer circuits is connected to the first latch of the plurality of latches,
wherein a second slicer circuit of the plurality of slicer circuits is connected with the second latch of the plurality of latches,
wherein a third slicer circuit of the plurality of slicer circuits is connected with the third latch of the plurality of latches, and
wherein a fourth slicer circuit of the plurality of slicer circuits is connected with the fourth latch of the plurality of latches.

12. The method of claim 11, wherein the first slicer circuit, the second slicer circuit, the third slicer circuit and the fourth slicer circuit of the plurality of slicer circuits each generate two speculative bit streams corresponding to respective ones of the plurality of streams of data samples by adding a negative offset of a close phase to the input signal and a positive offset of the close phase to the input signal.

13. The method of claim 11, wherein the first slicer circuit is configured to sample the input signal on a positive level of the first clock phase of the different clock phases, reset on a negative level of the first clock phase to generate a first Return-to-Zero (RZ) signal of a plurality of RZ signals, and feed the first RZ signal to the first latch of the plurality of latches;

wherein the second slicer circuit is configured to sample the input signal on a positive level of the second clock phase of the different clock phases, resets on a negative level of the second clock phase to generate a second RZ signal of the plurality of RZ signals, and feed the second RZ signal to the second latch of the plurality of latches;

wherein the third slicer circuit is configured to sample the input signal on a positive level of the third clock phase of the different clock phases, reset on a negative level of the third clock phase to generate a third RZ signal of the plurality of RZ signals, and feed the third RZ signal to the third latch of the plurality of latches; and wherein the fourth slicer circuit is configured to sample the input signal on a positive level of the fourth clock phase of the different clock phases to generate a fourth RZ signal of the plurality of RZ signals, and feed the fourth RZ signal to the fourth latch of the plurality of latches.

14. The method of claim 13,
wherein the first latch is configured to receive the first RZ signal from the first slicer circuit and convert the first RZ signal into the first Non-Return to-Zero (NRZ) signal, wherein the first slicer circuit and the first latch are operated at the first clock phase of the different clock phases,
wherein the second latch is configured to receive the second RZ signal from the second slicer circuit and convert the second RZ signal into the second Non-Return to-Zero (NRZ) signal, wherein the second slicer circuit and the second latch are operated at the second clock phase of the different clock phases,
wherein the third latch is configured to receive the third RZ signal from the third slicer circuit and convert the third RZ signal into the third Non-Return to-Zero (NRZ) signal, wherein the third slicer circuit and the third latch are operated at the third clock phase of the different clock phases, and
wherein the fourth latch is configured to receive the fourth RZ signal from the fourth slicer circuit and convert the fourth RZ signal into the fourth Non-Return to-Zero (NRZ) signal, wherein the fourth slicer circuit and the fourth latch are operated at the fourth clock phase of the different clock phases.

15. The method of claim 11,
wherein the first latch holds a previously sampled state of the first slicer circuit when an output of the first slicer circuit moves into a reset phase,
wherein the second latch holds a previously sampled state of the second slicer circuit when an output of the second slicer circuit moves into a reset phase,
wherein the third latch holds a previously sampled state of the third slicer circuit when an output of the third slicer circuit moves into a reset phase, and
wherein the fourth latch holds a previously sampled state of the fourth slicer circuit when an output of the fourth slicer circuit moves into a reset phase.

16. The method of claim 9, wherein the plurality of quarter rate look ahead circuits further comprise a plurality of multiplexers that comprise:
a first multiplexer configured to generate two first speculative data streams and multiplex respective correction coefficients of the first latched output from the first latch, wherein a select line of the first multiplexer is connected to a 4UI delayed version of a fourth data output of the plurality of quarter rate look ahead circuits,
a second multiplexer configured to generate two second speculative data streams and multiplex respective correction coefficients of the second latched output from the second latch, wherein a select line of the second multiplexer is connected to the 4UI delayed version of a fourth data output of the plurality of quarter rate look ahead circuits,
a third multiplexer configured to generate two third speculative data streams and multiplex respective correction coefficients of the third latched output from the third latch, wherein a select line of the third multiplexer is connected to a multiplexer output of the second multiplexer, and
a fourth multiplexer configured to generate two fourth speculative data streams and multiplex respective correction coefficients of the fourth latched output from the fourth latch, wherein a select line of the fourth multiplexer is connected to the multiplexer output of the second multiplexer.

17. The method of claim 16, wherein the plurality of quarter rate look ahead circuits further comprise:
a ninth flip flop configured to receive a multiplexer output of the first multiplexer and generate a first data output of the plurality of quarter rate look ahead circuits;
a tenth flip flop configured to receive the multiplexer output of the second multiplexer and generate a second data output of the plurality of quarter rate look ahead circuits;
a eleventh flip flop configured to receive a multiplexer output of the third multiplexer and generate a third data output of the plurality of quarter rate look ahead circuits; and
a twelfth flip flop configured to receive a multiplexer output of the fourth multiplexer and generate a fourth data output of the plurality of quarter rate look ahead circuits.

18. A quarter rate speculative decision feedback equalizer (DFE), comprising:
an input terminal configured to receive an input signal comprising a plurality of symbols;
a plurality of sampler circuits configured to sample the input signal that was received and generate a plurality of data samples in parallel, wherein the plurality of sampler circuits use a plurality of different clock phases at a specified data rate; and
a plurality of quarter rate look ahead circuits that are connected to the plurality of sampler circuits and are configured to simultaneously perform an align operation and a look ahead operation on the plurality of data samples based on the plurality of different clock phases to obtain a plurality of latched outputs,
wherein the plurality of quarter rate look ahead circuits comprise a plurality of multiplexers that are configured to select a corresponding one of two respective speculative data streams generated by multiplexing respective correction coefficients of each of the plurality of latched outputs,
wherein first and second select lines of corresponding ones of the plurality of multiplexers are driven based on one of data outputs of the plurality of quarter rate look ahead circuits, and
wherein third and fourth select lines of corresponding ones of the plurality of multiplexers are driven based on a multiplexer output of one of the plurality of multiplexers,
wherein ones of the plurality of latched outputs are from a first latch, a second latch, a third latch, and a fourth latch of the plurality of sampler circuits, and
wherein the plurality of quarter rate look ahead circuits comprise:
a first flip flop connected to the first latch, wherein the first flip flop is configured to receive a first Non-Return to-Zero (NRZ) signal from the first latch and to sample the first NRZ signal with a first clock phase in a first pipelining stage, and wherein a first output of the first flip flop is latched and triggered by a fifth latch using a second clock phase to generate a first latched output of the plurality of latched outputs;
a second flip flop connected to the fifth latch;
a third flip flop connected to the second latch, wherein the third flip flop is configured to receive a second NRZ signal from the second latch, wherein the second NRZ signal is sampled by a third clock phase in a second pipelining stage, wherein a second output of the third flip flop is latched using a fourth clock phase to generate a second latched output of the plurality of latched outputs, and wherein the third clock phase is different from the fourth clock phase;

a fourth flip flop that is configured to operate responsive to a sixth latch;

a fifth flip flop connected to a sixth flip flop, wherein the fifth flip flop is driven by the third clock phase, wherein the fifth flip flop is configured to receive a third NRZ signal from the third latch, wherein the third NRZ signal is sampled by a fifth clock phase in a third pipelining stage to generate a third latched output of the plurality of latched outputs; and a seventh flip flop that is configured to trigger an eighth flip flop, wherein the seventh flip flop is driven by the fourth clock phase, wherein the seventh flip flop is configured to receive a fourth NRZ signal from the fourth latch, and wherein the fourth NRZ signal is sampled by a sixth clock phase in a fourth pipelining stage to generate a fourth latched output of the plurality of latched outputs.

\* \* \* \* \*